US007734469B1

(12) United States Patent
Murgia et al.

(10) Patent No.: US 7,734,469 B1

(45) Date of Patent: Jun. 8, 2010

(54) DENSITY MEASUREMENT METHOD AND SYSTEM FOR VOIP DEVICES

(75) Inventors: Carlo Murgia, Aliso Viejo, CA (US); Craig S. Mellon, Vista, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 963 days.

(21) Appl. No.: 11/317,297

(22) Filed: Dec. 22, 2005

(51) Int. Cl.

| | |
|---|---|
| ***G10L 19/00*** | (2006.01) |
| ***G10L 21/00*** | (2006.01) |
| ***H04B 17/00*** | (2006.01) |

(52) U.S. Cl. ........................ 704/270; 704/201; 375/224

(58) Field of Classification Search ................. 704/201, 704/270, 270.1; 379/1.01, 1.03; 370/332; 375/224

See application file for complete search history.

(56) References Cited

U.S. PATENT DOCUMENTS

| | | | | |
|---|---|---|---|---|
| 5,784,406 | A * | 7/1998 | DeJaco et al. | 375/224 |
| 6,324,503 | B1 * | 11/2001 | Manjunath et al. | 704/226 |
| 6,789,058 | B2 * | 9/2004 | Shlomot et al. | 704/201 |
| 6,873,956 | B2 * | 3/2005 | Murgia et al. | 704/504 |
| 7,076,421 | B2 * | 7/2006 | Murgia et al. | 704/200 |
| 7,082,299 | B2 * | 7/2006 | Lemieux et al. | 455/425 |
| 7,085,230 | B2 * | 8/2006 | Hardy | 370/232 |
| 7,139,245 | B2 * | 11/2006 | Preiss | 370/252 |
| 7,298,827 | B1 * | 11/2007 | Talalai | 379/1.04 |
| 7,327,985 | B2 * | 2/2008 | Morfitt et al. | 455/67.11 |
| 7,376,132 | B2 * | 5/2008 | Conway | 370/389 |
| 2004/0170164 | A1 * | 9/2004 | LeBlanc et al. | 370/389 |
| 2004/0193974 | A1 * | 9/2004 | Quan et al. | 714/724 |

OTHER PUBLICATIONS

Sun et al; Ifeachor, E.C., "Perceived speech quality prediction for voice over IP-based networks," Communications, 2002. ICC 2002. IEEE International Conference on, 2002, p. 2573-2577.*

Elaoud et al, "Experimental VoIP capacity measurements for 802.11b WLANs," Consumer Communications and Networking Conference, CCNC. 2005 Second IEEE, Jan. 3-6, 2005, pp. 272-277.*

Schmitter, et al., "Analysis of network conformity withvoice over IP specifications", Irish Systems and Signals Con-ference, Limerick, Ireland, Jul. 2003, pp. 82-86.*

* cited by examiner

*Primary Examiner*—James S Wozniak

(74) *Attorney, Agent, or Firm*—Farjami & Farjami LLP

(57) ABSTRACT

A density measurement system for measuring a density of a speech processing device including a plurality of channels each having an encoder and a decoder, where each one of the plurality of channels is coupled to another one of the plurality of channels to provide a plurality of coupled pairs. The system comprises a first signal injector module for injecting a first speech signal into a first one of each coupled pair; a second signal injector module for injecting a second speech signal into a second one of each coupled pair; a quality module connected to each decoder for measuring a quality value for each decoder; and an error module connected to each encoder for determining an error value for each encoder, wherein the system determines the density of the speech processing device based on the quality value of each decoder and the error value of each encoder.

22 Claims, 3 Drawing Sheets

DENSITY MEASUREMENT METHOD AND SYSTEM FOR VOIP DEVICES

BACKGROUND OF THE INVENTION

1. Field of the Invention

The present invention relates generally to method and system for testing VoIP devices. More particularly, the present invention relates to method and system for measuring density of VoIP devices.

2. Background Art

Subscribers use speech quality as the benchmark for assessing the overall quality of a telephone network. VoIP (Voice over Internet Protocol or Packet Network) devices, which are placed at the edge of the packet network, perform the task of encoding (speech compression) and decoding (speech decompression) for communication of speech data over the packet network. Each VoIP device includes a certain number of channels, where each channel includes an encoder for encoding speech signals for transmission over the packet network, and a decoder for receiving the encoded speech data over the packet network and generating decoded speech data. A VoIP device has a processing power, which is typically defined by millions of instructions per second (MIPS) that the VoIP device can execute. The density of a VoIP device is defined based on the number of channels that the VoIP device can process given the total MIPS. In the conventional approach, the density of a VoIP device is determined by measuring the MIPS consumed for processing one channel, and then the total MIPS of the VoIP device is divided by the MIPS consumed for processing the one channel to determine the VoIP density. For example, if a VoIP device has a processing power of 1,000,000 MIPS, and processing one channel consumes 10,000 MIPS, the density of the VoIP is determined to be 1,000,000/10,000 or 100. In other words, it is assumed that the VoIP device would be capable of handling 100 channels simultaneously. Therefore, if the VoIP includes 120 channels, the VoIP device would be unable to process some channels when the voice traffic exceeds the processing power of the VoIP device.

The conventional approach to density measurement, however, suffers from many drawbacks and disadvantages. First, when additional channels are utilized, the VoIP device may consume more MIPS per channel than the number of MIPS for a single channel. This is because more overhead is added due to the interaction between the active channels. Second, the voice quality may degrade as more channels are utilized. Third, the test signals may not provide a real-world complexity for an accurate density measurement. For example, the test signals may not cause echo cancellers to be engaged, or the test signals may create double talk conditions, which disturb the speech quality measurement.

Accordingly, there is a need in the art for method and system of measuring density of VoIP devices, which provide a more accurate representation of the density based on real-world conditions.

SUMMARY OF THE INVENTION

The present invention is directed to a density measurement system for measuring a density of a speech processing device including a plurality of channels each having an encoder and a decoder, where each one of the plurality of channels is coupled to another one of the plurality of channels to provide a plurality of coupled pairs. In one aspect, the density measurement system comprises a first signal injector module for injecting a first speech signal into a first one of each coupled pair; a second signal injector module for injecting a second speech signal into a second one of each coupled pair; a quality module connected to an output of each decoder; and an error module connected to an output of each encoder; wherein the quality module measures a quality value for each decoder, and the error module determines an error value for each encoder where the error value is indicative of a degree to which each encoder has run out of time, and wherein the density measurement system determines the density of the speech processing device based on the quality value of each decoder and the error value of each encoder. In one aspect, the error value is a total number of frame erasures (FE) generated by the encoder, as an indication of the degree to which each encoder has run out of time.

In a further aspect, the first speech signal includes an echo of the second speech signal, and the second speech signal includes an echo of the first speech signal. In another aspect, the first speech signal includes background noise.

In an additional aspect, the first signal injector module injects voice signals into the first one of each coupled pair simultaneously with the second signal injector module injecting voice signals into the second one of each coupled pair to cause a double talk condition. In another aspect, the first signal injector module injects voice signals into the first one of each coupled pair after the second signal injector module injects voice signals into the second one of each coupled pair to avoid a double talk condition.

In one aspect, the density measurement system determines that the density of the speech processing device equals the plurality of channels if each quality value is close to a reference quality value and each error value is less than a predetermined threshold. In a further aspect, the reference quality value is determined based on the first signal injector module injecting the first speech signal into the first one of a single coupled pair, and the second signal injector module injecting the second speech signal into the second one of the single coupled pair. In yet another aspect, each quality value is a PESQ (Perceptual Evaluation of Speech Quality, ITU-T Recommendation P.862) value.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
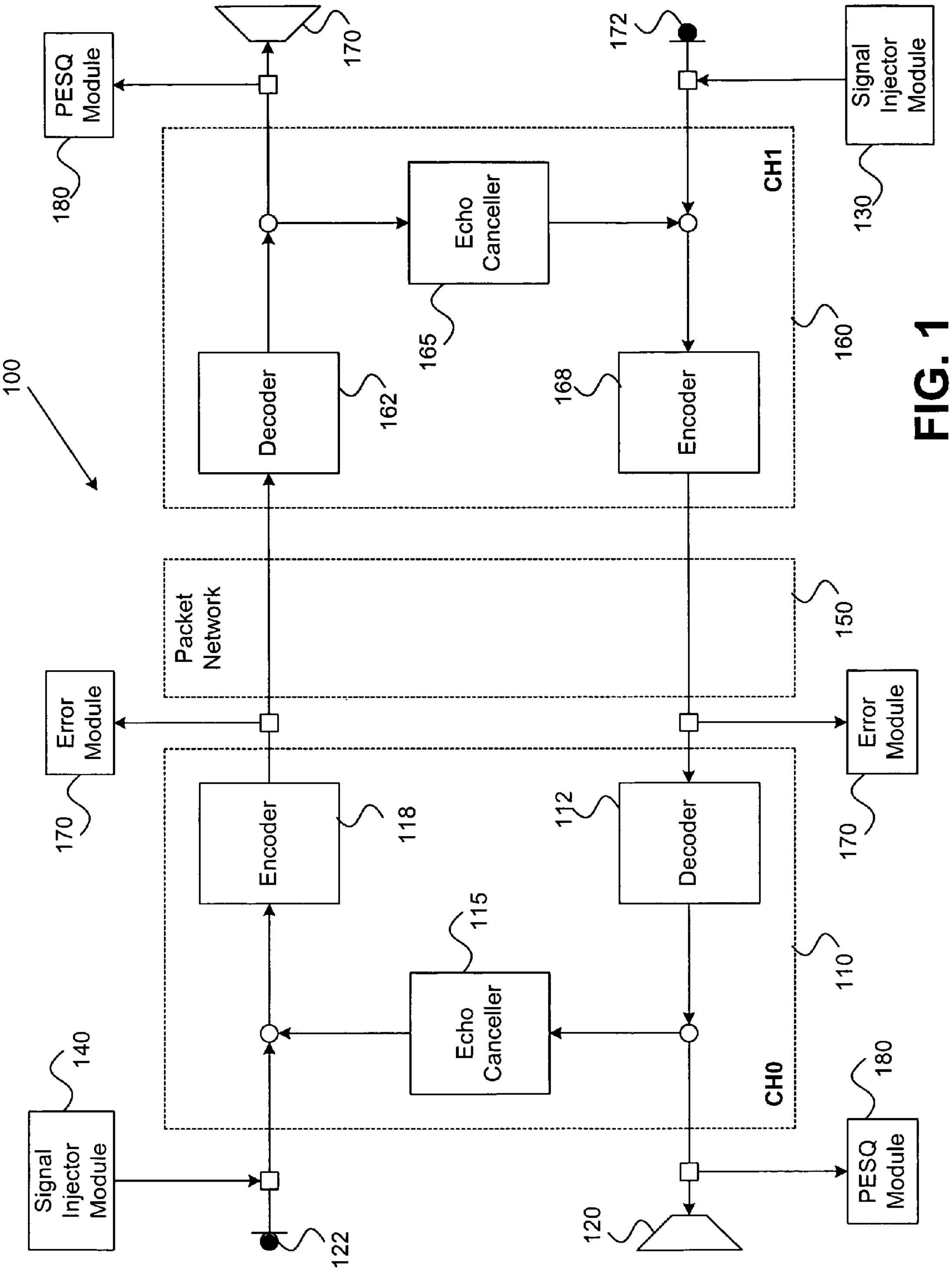
FIG. 1 illustrates a block diagram of a density measurement system, according to one embodiment of the present invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates block diagram of density measurement system 100, according to one embodiment of the present invention. Density measurement system 100 includes a first channel, designated by Channel 0 ("CH0") 110 and a second channel, designated by Channel 1 ("CH1") 160, which are two separate speech channels of a VoIP device or speech processing device under test. As shown, density measurement system 100 further includes packet network 150 or simulated packet network 150, which simulates a communication medium for CH0 110 and CH1 160. As further shown, CH0 110 includes decoder 112, echo canceller 115 and encoder 118, and CH1 160 includes decoder 162, echo canceller 165 and encoder 168.

Encoders 118 and 168 are used to encode or compress digitized speech data obtained from microphone 122 and 172, respectively. Speech compression techniques are well known in the art, and include ITU (International Telecommunication Union) G.711, G.723.1, G.729, 3GPP2 ($3^{rd}$ Generation Partnership Project 2) Selectable Mode Vocoder (SMV), etc. Decoders 112 and 162 are used to decode or decompress encoded speech data obtained from encoders 118 and 168, respectively, over packet network 150, and to provide digitized speech data to speakers 120 and 170, respectively.

Figure 2B:
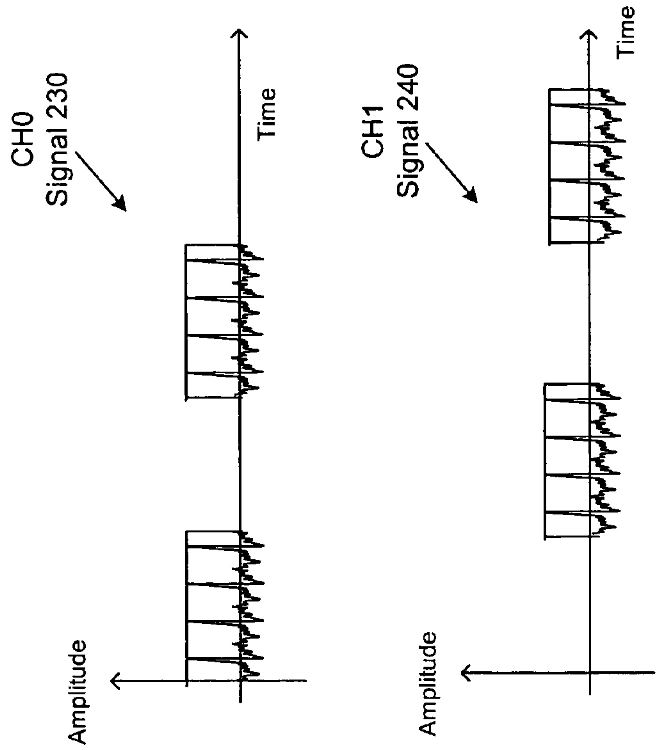
FIG. 2B illustrates a timing diagram for injection of speech signals into the density measurement system of FIG. 1, according to one embodiment of the present invention.
Figure 2A:
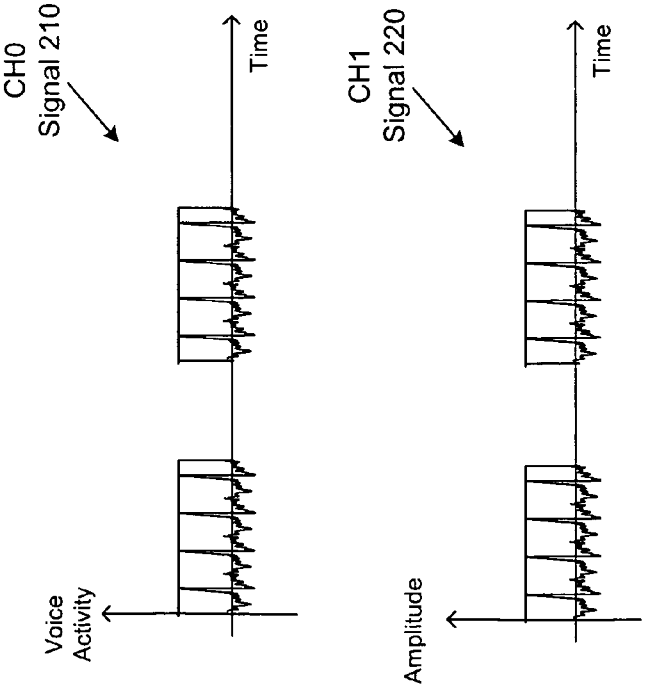
FIG. 2A illustrates a timing diagram for injection of speech signals into conventional density measurement systems.

Density measurement system 100 also includes signal injector module 140 and signal injector module 130 for injecting speech signals into CH0 110 and CH1 160, rather than receiving speech signals from microphones 122 and 172. Signal injector modules 130 and 140 inject speech signals different than speech signals that are injected by conventional density measurement system. For example, FIG. 2A illustrates speech signals that are injected by conventional density measurement systems. As shown, CH0 signal 210 and CH1 signal 220 are injected into conventional density measurement system simultaneously. The drawback of injecting simultaneous voice signals into the conventional density measurement system is that echo canceller 115 and echo canceller 165 would detect a double talk condition, which can result in a degradation in the speech signal quality and affect the VoIP device evaluation by the conventional density measurement system. In contrast, density measurement system 100 uses signal injector module 130 and signal injector module 140 to inject voice signal into CH1 160 and CH0 in an alternate fashion, such that the double talk condition does not occur at all time. FIG. 2B illustrates CH0 signal 230 and CH1 signal 240 generated by signal injector module 130 and signal injector module 140. As shown, generally, signal injector module 130 injects voice signal into CH1 160 during the time period when signal injector module 140 is not injecting voice signal into CH1 110 to avoid persistent double talk conditions that affect the speech signal quality measurement of the VoIP device. However, density measurement system 100 may intermittently cause a double talk condition for creating real-world conditions and varying the complexity for CH0 110 and CH1 160 of the VoIP device.

In one embodiment of the present invention, CH0 signal 230 includes clean speech signals and CH1 signal 240 includes speech signals with background noise to provide a real-world complexity for the VoIP device. Signal injector modules 130 and 140 further simulate an echo of CH0 signal 230 and an echo of CH1 signal 240, respectively, such that echo cancellers 115 and 165 are engaged by CH0 110 and CH1 160 to cancel the echoes as in real-world scenarios, since engagement of echo cancellers 115 and 165 increase the MIPS usage by the VoIP device.

Figure 3:
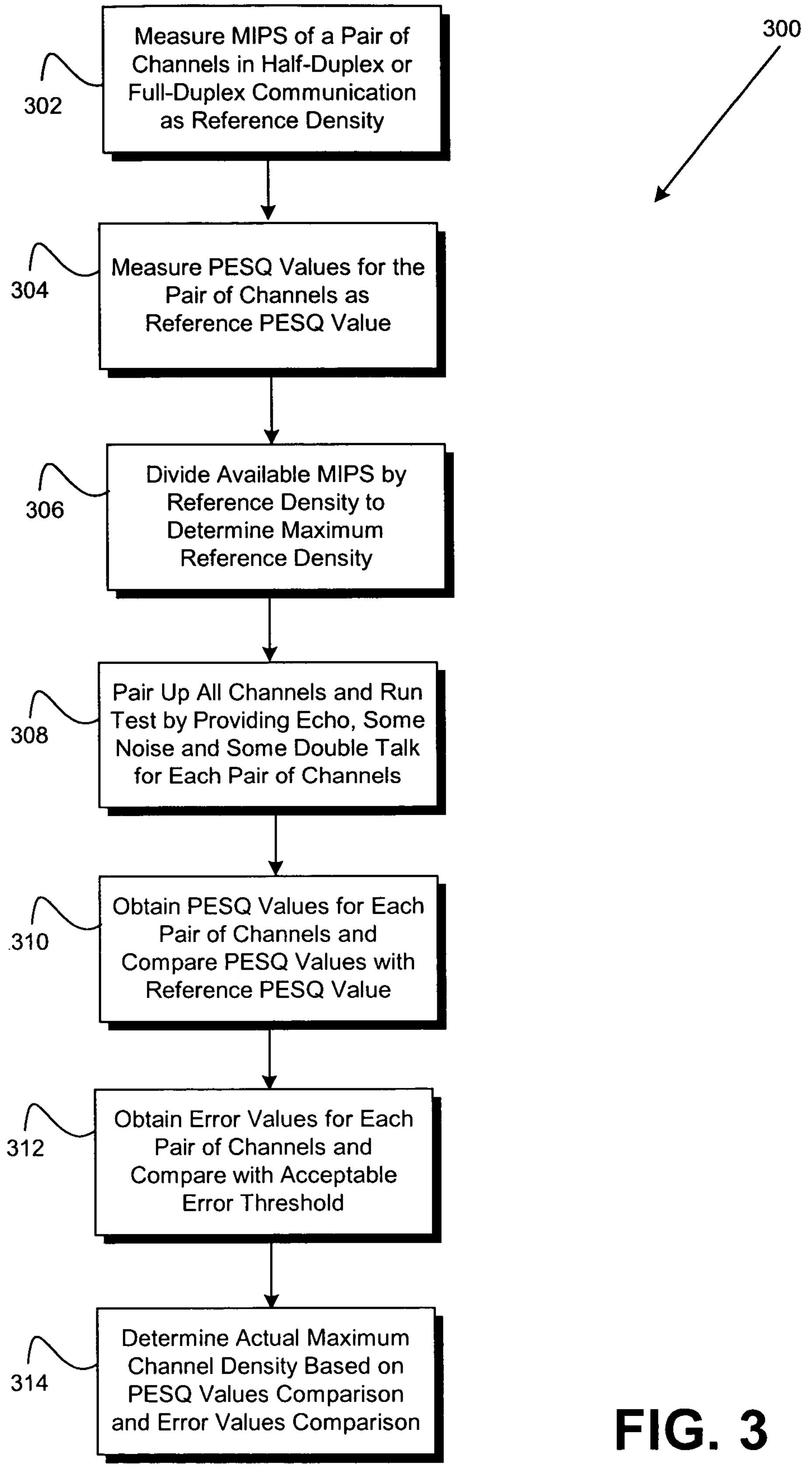
FIG. 3 illustrates a flow diagram for use in conjunction with the density measurement system of FIG. 1 for measuring the density of a VoIP device, according to one embodiment of the present invention.

Turning to FIG. 3, it illustrates density measurement flow diagram 300 for use in conjunction with density measurement system 100, according to one embodiment of the present invention. Density measurement flow diagram 300 begins at step 302 by coupling CH0 110 and CH1 160 and injecting speech signals into density measurement system 100 using one of signal injector modules 130 and 140 in a half-duplex mode, or using both signal injector modules 130 and 140 in a full-duplex mode. Also, at step 302, density measurement system 100 determines the amount of MIPS consumed for the channels under test, and density measurement system 100 stores the consumed MIPS as a reference MIPS value. As stated above, in one embodiment, the speech signals injected into density measurement system 100 may include echo signals to engage the echo cancellers, some double talk and background noise to obtain a reference MIPS value or a reference density value that is based on real-world conditions.

Next, at step 304, PESQ module 180 measures the quality of the injected signals, which pass through one channel encoder to another channel decoder through packet network 150. Further, at step 304, density measurement system 100 stores the PESQ value(s) as reference PESQ value(s). To objectively compare and contrast the voice quality of various VoIP implementations, the ITU has defined a method for assessing the voice quality in the ITU-T Recommendation P.862, entitled "Perceptual Evaluation of Speech Quality (PESQ): An objective Method of End-To-End Speech Quality Assessment of Narrowband Telephone Networks and Speech Codecs," dated February 2001. It should be noted that various embodiments of the present invention may use quality measurement algorithms other than PESQ.

At step 306, the total MIPS available to the VoIP device is divided by the reference MIPS value to determine the estimated number of channels that can be supported by the VoIP device, i.e. the estimated density of the VoIP device. In the alternative, the estimated number of channels may be determined using a technique described in U.S. Pat. No. 6,873,956, issued Mar. 29, 2005, and entitled "Multi-Channel Speech Processor with Increased Channel Density." Next, at step 308, all channels of the VoIP device are paired up, and signal injector modules 130 and 140 inject speech signals into respective ones of each pair of channels. To create real-world conditions, the speech signals injected into density measurement system 100 may include echo signals to engage the echo cancellers, some double talk and background noise to obtain a total consumed MIPS based on real-world conditions.

At step 310, density measurement system 100 obtains two PESQ values for each pair of channels using PESQ module 180. Each PESQ value is compared with the reference PESQ value to determine whether speech quality has degraded due to increased load on the VoIP device by running all the channels simultaneously. Further, at step 312, density measurement system 100 uses error module 170 to determine a degree to which encoders 118 and 168 of each pair of channels have run out of time. In one embodiment, encoders 118 and 168 of each pair of channels may generate frame erasure (FE) frames, or any other similar indication of running out of time, indicative of not being able to keep up with the incoming speech signals, i.e. whether the VoIP device is running out of MIPS to service the channel. In such embodiment, the error value may indicate the number of frame erasures detected during a predetermined period of time, which may be compared against a predetermined acceptable FE occurrences.

At step 314, density measurement system 100 determines the density of the VoIP device or the number of channels that the VoIP device may run simultaneously while maintaining an acceptable level of speech quality, based on the error values determined in step 312 and PESQ values determined in step 310. In one embodiment, the VoIP device is determined to have a density equal to the total number of channels (or the estimated density) if each PESQ value is close to the reference PESQ value and each error value is less than a predetermined threshold. Conversely, the VoIP device is determined to not have a density equal to the estimated numbers of channels if one or more PESQ values are not close to the reference PESQ value or one or more error values are not less than the predetermined threshold.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A density measurement system implemented using circuitry and software for measuring a density of a single speech processing device including a plurality of channels each having an encoder and a decoder, where each one of the plurality of channels is coupled to another one of the plurality of channels to provide a plurality of coupled pairs, the single speech processing device having a processing power definable by millions of instructions per second (MIPS), the density measurement system comprising:

a first signal injector module for injecting a first speech signal into a first one of each coupled pair of the single speech processing device;

a second signal injector module for injecting a second speech signal into a second one of each coupled pair of the single speech processing device;

a quality module connected to an output of each decoder; and an error module connected to an output of each encoder;

wherein the quality module measures a quality value for each decoder, and the error module determines an error value for each encoder, and wherein the density measurement system determines the density of the single speech processing device based on the quality value of each decoder and the error value of each encoder, wherein the density is a determined number of the plurality of channels, which the single speech processing device can run simultaneously for a given MIPS available to the single speech processing device while maintaining an acceptable level of speech quality, divided by the given MIPS.

2. The density measurement system of claim 1, wherein the error value is indicative of a degree to which the encoder having run out of time.

3. The density measurement system of claim 1, wherein the error value is a total number of frame erasures (FE) generated by the encoder.

4. The density measurement system of claim 1, wherein the first speech signal includes an echo of the second speech signal.

5. The density measurement system of claim 4, wherein the second speech signal includes an echo of the first speech signal.

6. The density measurement system of claim 1, wherein the first speech signal includes background noise.

7. The density measurement system of claim 1, wherein the first signal injector module injects voice signals into the first one of each coupled pair simultaneously with the second signal injector module injecting voice signals into the second one of each coupled pair to cause a double talk condition.

8. The density measurement system of claim 1 wherein the density measurement system determines that the density of the single speech processing device equals the plurality of channels if each quality value is close to a reference quality value and each frame erasure (FE) value is less than a predetermined threshold.

9. The density measurement system of claim 8, wherein the reference quality value is determined based on the first signal injector module injecting the first speech signal into the first one of a single coupled pair, and the second signal injector module injecting the second speech signal into the second one of the single coupled pair.

10. The density measurement system of claim 1, wherein each quality value is a PESQ (Perceptual Evaluation of Speech Quality) value.

11. The method of claim 10, wherein the error value is indicative of a degree to which the encoder having run out of time.

12. The method of claim 10, wherein the error value is a total number of frame erasures (FE) generated by the encoder.

13. The method of claim 10, wherein the first speech signal includes an echo of the second speech signal.

14. The method of claim 13, wherein the second speech signal includes an echo of the first speech signal.

15. The density measurement system of claim 1, wherein the first signal injector module injects voice signals into the first one of each coupled pair after the second signal injector module injects voice signals into the second one of each coupled pair to avoid a double talk condition.

16. A method of measuring a density of a single speech processing device using a density measurement system, the single speech processing device including a plurality of channels each having an encoder and a decoder, where each one of the plurality of channels is coupled to another one of the plurality of channels to provide a plurality of coupled pairs, the single speech processing device having a processing power definable by millions of instructions per second (MIPS), the method comprising:

injecting a first speech signal into a first one of each coupled pair of the single speech processing device using a first signal injector module;

injecting a second speech signal into a second one of each coupled pair of the single speech processing device using a second signal injector module;

measuring a quality module a quality value for each decoder using a quality module connected to an output of each decoder;

determining an error value for each encoder module using an error module connected to an output of each encoder; and calculating the density of the single speech processing device based on the quality value of each decoder and the error value of each encoder, wherein the density is a determined number of the plurality of channels, which the single speech processing device can run simultaneously for a given MIPS available to the single speech processing device while maintaining an acceptable level of speech quality, divided by the given MIPS.

17. The method of claim 16, wherein the first speech signal includes background noise.

18. The method of claim 16 further comprising: injecting voice signals into the first one of each coupled pair simultaneously with injecting voice signals into the second one of each coupled pair to cause a double talk condition.

19. The method of claim 16 further comprising: determining the density of the single speech processing device equals the plurality of channels if each quality value is close to a reference quality value and each frame erasure (FE) value is less than a predetermined threshold.

20. The method of claim 19 further comprising: determining the reference quality value based on the first signal injector module injecting the first speech signal into the first one of a single coupled pair, and the second signal injector module injecting the second speech signal into the second one of the single coupled pair.

21. The method of claim 16, wherein each quality value is a PESQ (Perceptual Evaluation of Speech Quality) value.

22. The method of claim 16 further comprising: injecting voice signals into the first one of each coupled pair after the second signal injector module injecting voice signals into the second one of each coupled pair to avoid a double talk condition.

* * * * *